United States Patent [19]

Hayes

[11] Patent Number: 5,208,980
[45] Date of Patent: May 11, 1993

[54] METHOD OF FORMING TAPERED ORIFICE ARRAYS IN FULLY ASSEMBLED INK JET PRINTHEADS

[75] Inventor: Donald J. Hayes, Plano, Tex.

[73] Assignee: Compaq Computer Corporation, Houston, Tex.

[21] Appl. No.: 815,396

[22] Filed: Dec. 31, 1991

[51] Int. Cl.$^5$ ............................................. B41J 3/04
[52] U.S. Cl. ..................................... 29/890.1; 29/557; 219/121.69; 219/121.72
[58] Field of Search ..................... 29/890.01, 428, 557, 29/25.35, 611; 219/121.69, 121.7, 121.71, 121.72; 346/140

[56] References Cited

U.S. PATENT DOCUMENTS

| | | | |
|---|---|---|---|
| 4,430,784 | 2/1984 | Brooks et al. | 29/890.1 |
| 4,680,859 | 7/1987 | Johnson | 29/611 |
| 4,716,423 | 12/1987 | Chan et al. | 29/890.1 |
| 4,733,447 | 3/1988 | Ageishi | 29/890.1 |
| 4,789,425 | 12/1988 | Drake et al. | 29/611 |
| 4,820,897 | 4/1989 | Lefevre | 29/25.35 |
| 4,922,265 | 5/1990 | Pan | 29/890.1 |
| 5,016,024 | 5/1991 | Lan et al. | 346/140 |
| 5,072,240 | 12/1991 | Miyazawa et al. | 29/25.35 |

FOREIGN PATENT DOCUMENTS

| | | | |
|---|---|---|---|
| 0113470 | 9/1981 | Japan | 29/890.1 |
| 0182449 | 11/1982 | Japan | 29/890.1 |
| 0054858 | 3/1985 | Japan | 29/890.1 |

OTHER PUBLICATIONS

IBM Tech Disc Bulletin vol. 26 No. 3A Aug. 1983 "Nozzle Plate" G. S. Ratchford.

*Primary Examiner*—Irene Cuda
*Attorney, Agent, or Firm*—Konneker & Bush

[57] ABSTRACT

A method of forming an outwardly tapered orifice for a fully assembled ink jet printhead. A main body portion and a cover plate for an ink jet printhead are mounted together such that the cover plate covers an ink-carrying channel which axially extends through the main body portion. First and second light beams capable of ablating the material used to form the cover plate are generated and an ink-carrying channel communicating orifice extending through the cover plate and tapering outwardly from a front side of the cover plate to a back side of the cover plate is formed by directing the first and second light beams at the front side of the cover plate at first and second angles, respectively, whereby the first and second light beams form the outwardly tapered orifice.

12 Claims, 2 Drawing Sheets

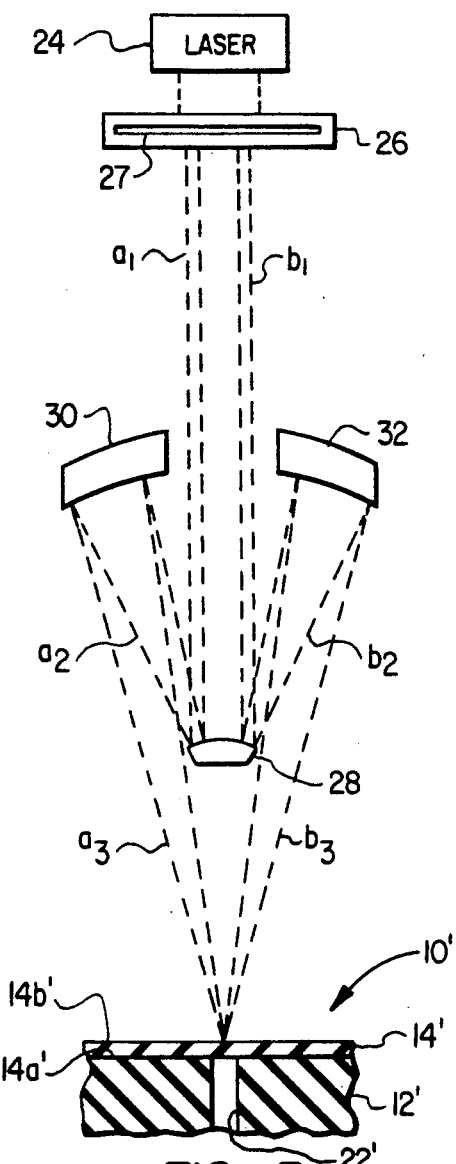
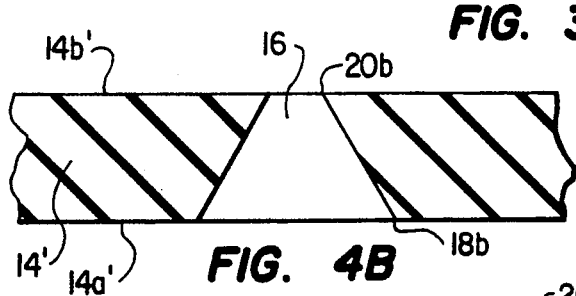
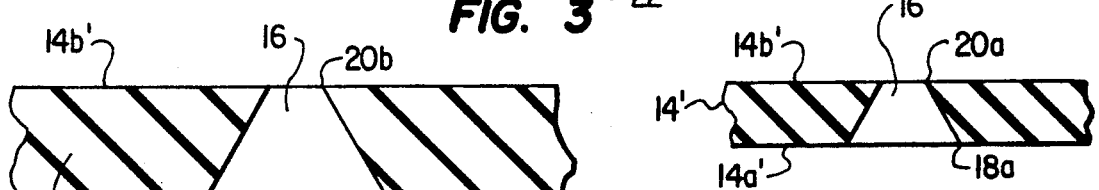
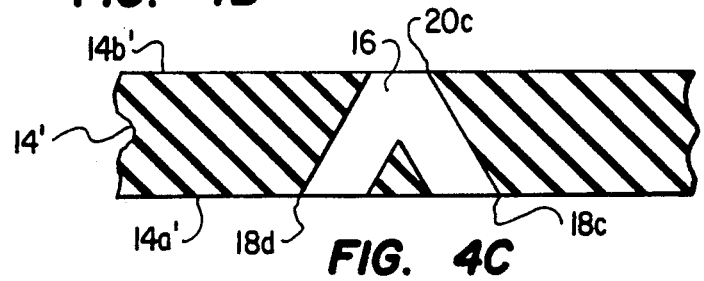

METHOD OF FORMING TAPERED ORIFICE ARRAYS IN FULLY ASSEMBLED INK JET PRINTHEADS

BACKGROUND OF THE INVENTION

1. Field of the Invention

The invention relates to a method of manufacturing ink jet printheads and, more particularly, to a method of forming tapered orifice arrays in fully assembled ink jet printheads.

2. Description of Related Art

A popular form of non-impact printing is generally referred to as ink jet printing. In this technique, ink is forced, most commonly under pressure, through a tiny nozzle to form a droplet. The droplet is electrostatically charged and then attracted towards an oppositely charged platen located behind a sheet paper. Using electrically controlled deflection plates similar to those in a CRT, the trajectory of the droplet can be controlled to hit a desired spot on the paper. Unused drops are deflected away from the paper into a reservoir for recycling of the ink. Due to the small size of the droplet and the precise trajectory control, ink jet printing quality can approach that of formed-character impact printing.

Most commonly, prior ink jet printheads include a body portion having a plurality of ink-carrying channels formed therein for the ejection of ink droplets therefrom. A pressure pulse is then generated in the ink-filled channel. For example, a wall of the channel may be mechanically deflected to compress or expand the size of the channel. The resultant pressure wave would then cause the ejection of a droplet from the front end of the channel.

Many ink jet printheads also include a cover plate fixedly mounted on the front end of the body portion. Extending through the cover plate would be a plurality of orifices which comprise the orifice array for the ink jet printhead. In most ink jet printheads, each orifice in the orifice array corresponds to one of the channels extending through the body portion. The cover plate is positioned on the front end of the body portion such that each orifice is in communication with the corresponding channel. When a pressure wave is created in a channel, the ink droplet is forcedly ejected from the ink jet printhead through the orifice in communication with that channel. While many of such orifices are formed in a generally cylindrical shape, they are often tapered so that the speed and/or directional control of the droplet being ejected may be affected by the orifice shape. For example, by inwardly tapering the orifice by narrowing the circumference of the orifice as it extends from the back side of the cover plate (the side mounted to the front end of the body portion) towards the front side of the cover plate where the ink droplets are ejected, the speed and stability of the ink droplets could be increased during the ejection process.

In order to form a tapered orifice array for an ink jet printhead, it was common to take the unattached cover plate and to drill a series of orifices therethrough, for example, utilizing conventional laser drilling techniques. As an orifice drilled utilizing conventional laser technology tends to inwardly taper as it is extended through a layer of material, it was possible to produce an orifice array comprised of a series of orifices which would taper inwardly with respect to the flow of ink outwardly therefrom by drilling a series of orifices in the back side of the unattached cover plate. Once drilling of the orifices was completed, a coating of an adhesive material, for example, epoxy, was placed on the back surface of the cover and/or the front end of the main body of the ink jet printhead. The cover would then be aligned with the front end of the main body so that each tapered orifice was located in front of and in communication with a corresponding channel extending through the main body of the ink jet printhead. After alignment of the cover plate and main body was completed, the cover would then be bonded to the front end of the main body of the ink jet printhead.

A significant problem in manufacturing ink jet printheads in this manner was that the adhesive typically used to bond the back side of the cover plate to the front end of the main body of the ink jet printhead tends to clog or partially block the orifices formed in the cover plate. This problem has become of particular concern in view of the increasing popularity of higher density ink jet printheads, i.e. ink jet printheads having a channel array where adjacent channels are spaced between approximately four and eight mils apart. In such high density ink jet printheads, the likelihood that the cover plate could be mounted on the main body of the ink jet printhead without having the adhesive clogging or partially blocking at least one of the tapered orifices formed in the cover plate has become increasingly more unlikely. This problem has significantly complicated present methods for manufacturing ink jet printheads, particularly those having an orifice array comprised of inwardly tapered orifices.

SUMMARY OF THE INVENTION

In one embodiment, the present invention is of a method of forming an orifice for an ink jet printhead comprising the steps of providing a main body portion and a cover plate for an ink jet printhead, mounting the cover plate onto the front side of the ink jet printhead body such that the cover plate covering an ink-carrying channel which axially extends through the main body portion and generating first and second lights beam capable of ablating the material used to form the cover plate. An ink-carrying channel communicating orifice extending through the cover plate and tapering outwardly from a front side of the cover plate to a back side of the cover plate is formed by directing the first and second light beams at the front side of the cover plate at first and second angles, respectively, such that the first and second light beams form the outwardly tapered orifice.

In one aspect of this embodiment of the invention, the outwardly tapered orifice is formed by directing the first and second light beams at a primary reflecting surface, reflecting the first and second light beams at first and second secondary reflecting surfaces, respectively, reflecting the first light beam reflected to the first secondary reflecting surface at a specified location on the front side of the cover plate, and reflecting the second light beam reflected to the second secondary reflecting surface at the specified location. In another aspect of this embodiment of the invention, the outwardly tapered orifice is formed having a height which increases from the front side of the cover plate to the back side of the cover plate. In yet another aspect of this embodiment of the invention, the outwardly tapered orifice is formed to have a first opening at the front side of the cover plate and first and second openings in communication with the ink-carrying channel at the back side of the cover plate. In still yet another aspect of this embodiment of the invention, the width and/or height of the orifice at the back side of the cover plate may be varied, either by selecting the thickness of the cover plate or by selecting the angle at which the light beam is directed at the cover plate.

In another embodiment, the present invention is of a method of forming a tapered orifice in an assembled ink jet printhead. First and second light beams capable of ablating material used to form the cover plate are generated and directed at a selected location on the front side of the cover plate at respective angles such that the first and second light beams ablate an ink-carrying channel communicating orifice extending through the cover plate and tapering outwardly therethrough.

In yet another embodiment, the present invention is of a method of forming an orifice array for an ink jet printhead. An ink jet printhead body having a front side and a plurality of ink-carrying channels axially extending therethrough is provided. A cover plate to be mounted onto the front side of the ink jet printhead body is selected based upon the desired size of the orifices at the inner side of the cover plate and then mounted onto the front side of the ink jet printhead body to cover the ink-carrying channels. For each orifice to be formed as part of the orifice array, first and second cover plate ablating light beams are generated and directed, at first and second angles, respectively, at specified locations on the front side of the cover plate which correspond to selected ones of the ink-carrying channels to form ink-carrying channel communicating orifices extending through the cover plate, tapering outwardly therethrough and in respective communication with the selected ones of the ink-carrying channels. In one aspect of this embodiment of the invention, a filter is selected based upon the number and location of orifices forming the orifice array and the cover plate ablating light is directed towards the filter such that the cover plate ablating light beams which will form the orifice array of outwardly tapered orifices pass therethrough.

BRIEF DESCRIPTION OF THE DRAWING

The present invention may be better understood, and its numerous objects, features and advantages will become apparent to those skilled in the art by reference to the accompanying drawing, in which:

FIG. 3 is a schematic view of a laser ablation system for manufacturing the ink jet printhead of FIGS. 1-2;

FIG. 4a is a cross-sectional view of a first tapered orifice which may be formed in the cover of the ink jet printhead of FIGS. 1-2 using the laser ablation system of FIG. 3;

FIG. 4b is a cross-sectional view of a second tapered orifice which may be formed in the cover of the ink jet printhead of FIGS. 1-2 using the laser ablation system of FIG. 3; and FIG. 4c is a cross-sectional view of a third tapered orifice which may be formed in the cover of the ink jet printhead of FIGS. 1-2 using the laser ablation system of FIG. 3.

DETAILED DESCRIPTION OF A PREFERRED EMBODIMENT

Figure 1:
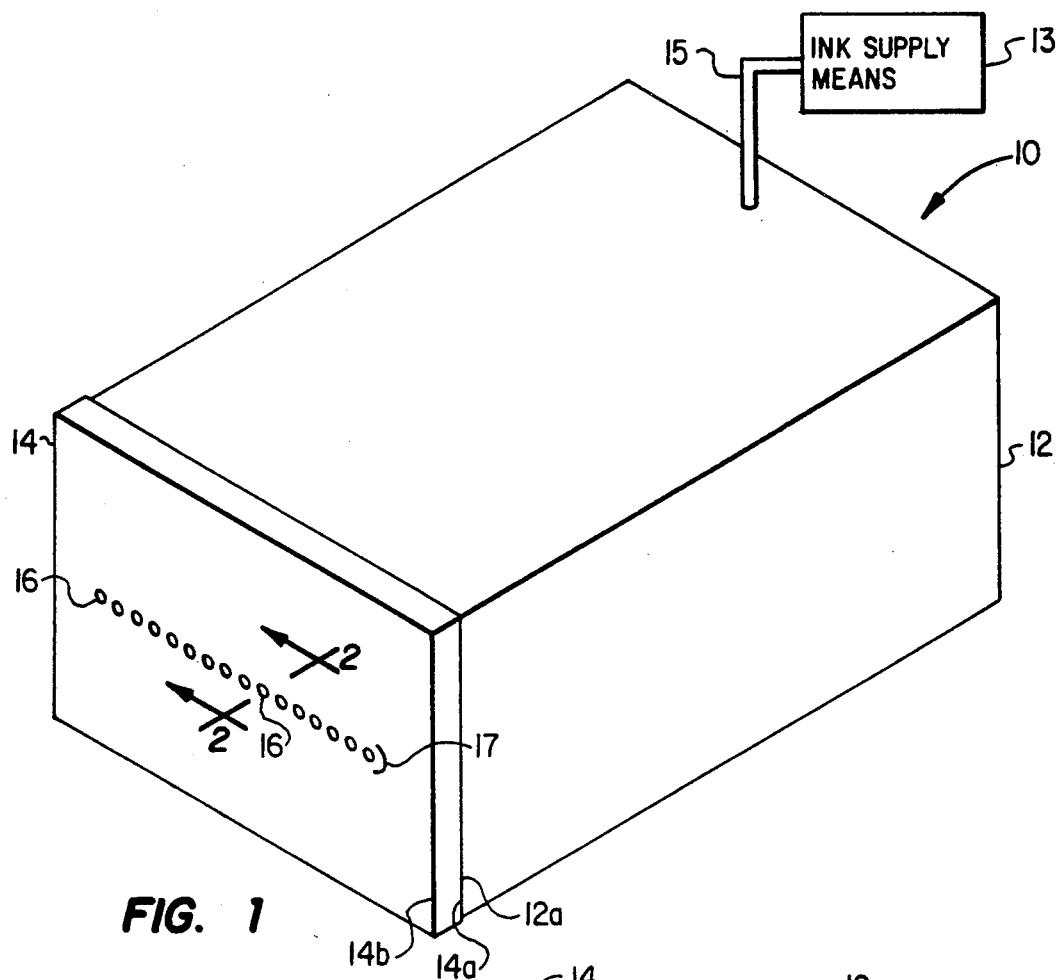
FIG. 1 is a perspective view of an ink jet printhead constructed in accordance with the teachings of the present invention.

Referring first to FIG. 1, an ink jet printhead 10 constructed in accordance with the teachings of the present invention may now be seen. As illustrated herein, the ink jet printhead 10 includes a main body portion 12 having a plurality of ink carrying channels (not visible in FIG. 1) axially extending therethrough. Typically, each of the ink carrying channels extend from a first end located within the main body 12 and terminate at an opening along a front side 12a of the main body portion 12. Preferably, the ink carrying channels should be generally parallel to each other along their entire length. Notwithstanding the specific configuration of the ink jet printhead 10 described and illustrated herein, it is fully contemplated that the method of forming a tapered orifice array in a fully assembled ink jet printhead which is the subject of the present invention is readily applicable to numerous other ink jet printhead configurations. Specifically, it is contemplated that the present invention may be used in combination with those configurations of the ink jet printhead 10 where the main body portion 12 of the ink jet printhead 10 is formed of a single piece of material, either active or inactive, or formed of any number of components, again, either active or inactive, bonded together to form the main body portion 12. It is further contemplated that the present invention may be used to form a single tapered orifice in an ink jet printhead having a single ink-carrying channel axially extending therethrough.

Ink is supplied to the ink-carrying channels from an ink supply means 13 via an external conduit 15. Many methods for supplying ink from the ink supply means to the ink-carrying channels are known in the art and, therefore, need not be described in greater detail here. For example, for the ink jet printhead 10, the external conduit 15 delivers the ink to a vertically orientated internal conduit (not shown) which, in turn, supplies the ink to a manifold (also not shown) extending lengthwise in the interior of the ink jet printhead 10. As the manifold is in communication with each of the parallel ink-carrying channels, ink may be drawn into the ink-carrying channels from the manifold.

Continuing to refer to FIG. 1, the ink jet printhead 10 further includes a cover plate 14 having a back side 14a, a front side 14b and a plurality of tapered orifices 16 extending therethrough. Preferably, the cover plate 14 should be formed of polyimide or another suitable material. The back side 14a is aligned, mated and bonded with the main body portion 12 such that each tapered orifice 16 is in communication with a corresponding one of the plurality of channels formed in the main body portion 12. Regarding the taper of the orifices 16, the orifices 16 may be considered to be "inwardly" tapered from the back side 14a of the cover plate 14 where the orifices 16 communicates with the corresponding one of the ink-carrying channels to the front side 14b of the cover plate 14 from where the ink droplets are ejected. Alternately, the orifices 16 may be considered to be "outwardly" tapered from the front side 14b of the cover plate 14 where the light beam drills the orifices 16 to the back side 14a of the cover plate 14 where the orifices 16 communicate with the corresponding one of the ink-carrying channels. Preferably, each tapered orifice 16 should be positioned such that it is located at the center of the end of the corresponding channel, thereby providing ink ejection nozzles for the channels. It is contemplated that the dimensions of the orifice array 17 comprised of the tapered orifices 16 could be varied to cover various selected lengths along the cover plate 14, depending on the channel requirements of the particular ink jet printhead 10 envisioned. For example, the orifice array 17 may extend about 0.193 inches along the front side 14b of the cover plate 14 and be comprised of about twenty-eight orifices 16 provided in a single row.

Figure 2:
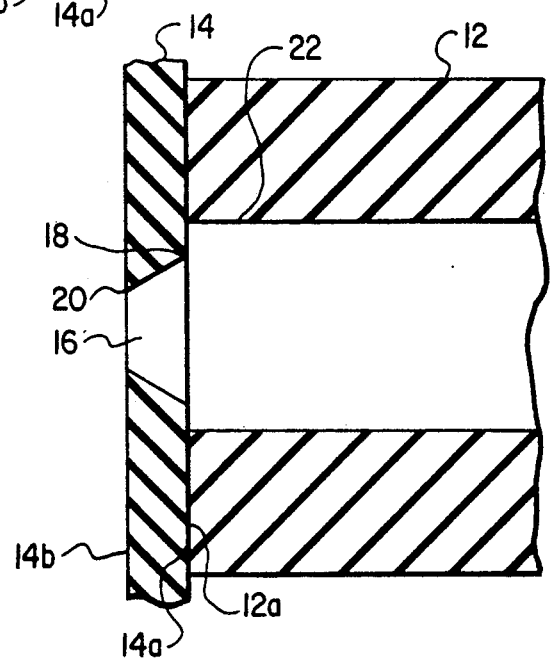
FIG. 2 is a partial cross-sectional view of the ink jet printhead of FIG. 1 taken along lines 2—2 and illustrating a parallel channel and orifice of the ink jet printhead of FIG. 1.

Referring next to FIG. 2, a tapered orifice 16 in communication with an ink-carrying channel 22 may now be seen. The tapered orifice 16 convergingly extends from an entry aperture 18 of a first height located at the back side 14a of the cover plate 14 to an exit aperture 20 of a second, lesser, height located at the front side 14b of the cover plate 14. The tapered orifice 16 communicates with a front end 23 of a corresponding ink-carrying channel 22 at the entry aperture 18. Thus, when a ink ejecting pressure pulse is applied to the channel 22, a droplet of ink would be forced out the front end 23 of the ink-carrying channel 22, through the inwardly tapered orifice 16, where its velocity would be increased, and ejected from the ink jet printhead 10 at the exit aperture 20.

Referring next to FIG. 3, the method of manufacturing an ink jet printhead having a single tapered orifice or an array of tapered orifices such as those illustrated in FIGS. 1-2 using laser ablation optics shall now be described. To form an orifice 16 in an ink jet printhead 10' having a single ink-carrying channel 22' formed therein or an orifice array 17 in the ink jet printhead 10 having multiple ink-carrying channels 22 formed therein, a orificeless cover 14' is first mounted onto a main body portion 12' of the ink jet printhead 10', most commonly, using an adhesive such as an epoxy, or other conventional mounting means, to cover the ink-carrying channel 22'. Next, a tapered orifice is formed, preferably in the approximate center of the ink-carrying channel 22' using a laser. Specifically, a laser 24 generates a coherent beam of UV light which passes through a mask chamber 26. Within the mask chamber 26 is a mask 27 for modifying the generated light beam so that it will pattern the location of the desired orifice or orifice array 17. The mask 27 may be comprised of a thin sheet of metal having a series of apertures (not shown) formed in an array which patterns the desired shape of the orifice array 17. Alternately, the mask 27 may be comprised of a sheet of glass having a thin film formed thereon which covers the entire sheet with the exception of particular locations which pattern the desired locations of the orifices 16 of the orifice array 17.

The generated coherent UV light passes through the apertures in the mask 27 and are then reflected off a primary reflecting surface 28 towards first and second secondary reflecting surfaces 30 and 32. For example, in FIG. 3, two beams of coherent light are illustrated emerging from the mask 17 along paths $a_1$, $b_1$, respectively. The beams travelling along paths $a_1$, $b_1$, are reflected off the primary reflecting surface 28 and directed towards the first and second secondary reflecting surfaces 30, 32, respectively, along paths $a_2$ and $b_2$. The first secondary reflecting surface 30 and the second secondary reflecting surface 32 are positioned relative to the orificeless cover plate 14' such that the beams travelling along paths $a_2$, $b_2$ are directed along paths $a_3$, $b_3$ at a selected location on a front side 14b' of the orificeless cover plate 14' where the beam converge, typically at equal but opposite angles to each other, at the selected location on the front side 14b' to drill a tapered orifice in the orificeless cover plate 14'. Of course, the mask 27 may be readily modified so that additional beams of light may emerge therefrom to drill additional tapered orifices in the orificeless cover 14' and the first and second reflecting surfaces 30, 32 may alternately be positioned such that the beams directed at the selected location, as well as the orifice formed by the beam, will elongate in both axes or will elongate in one axis, for example, height, and will not elongate in a second axis, for example, width. It is further contemplated that, in one embodiment of the invention, the mask 27 may be configured such that the beam of coherent light entering the mask 17 will emerge as a beam directed at the selected location and shaped such that it will drill a tapered orifice at the selected location on the front side 14b' of the orificeless cover plate 14'. Finally, it should be noted that while the embodiment of the invention described with respect to FIG. 3 is directed to a method of forming a tapered orifice array in a cover plate mounted to an ink jet printhead, it is specifically contemplated that, in accordance with one embodiment of the invention, tapered orifices extending outwardly from the front to back sides of the cover plate may be formed on an unmounted cover plate by directing cover plate ablating light onto the front surface of the unmounted cover plate in a manner identical to that described above.

Referring next to FIGS. 4a–4c, various configurations of each tapered orifice 16 may now be seen. Specifically, it may be seen that the width of the inner aperture 18 of the tapered orifice 16, as well as the number of inner apertures 18 per tapered orifice 16, may be controlled by modifying the thickness of the orificeless cover plate 14' since, as the thickness of the orificeless cover plate 14' is increased, the cover plate ablating beam continues to spread out along its elongated axis, thereby widening the taper of the orifice. It is further contemplated, however, that the width of the inner aperture 18 of the tapered orifice 16, as well as the angle of taper for the tapered orifice 16, may be modified, for example, by repositioning the first and secondary reflecting surfaces, by adjusting the angle at which the cover plate ablating beams converge at the orificeless cover plate 14'.

Referring specifically to FIG. 4a, an approximately one mil orificeless cover plate 14' was selected, thereby producing an inwardly tapered orifice 18 extending through the cover plate 14' from the back side 14a' towards the front side 14b' of the cover plate 14' in which the inner aperture 18a is approximately 2.5 to 3 times wider than the exit aperture 20a. Referring next to FIG. 4b, an approximately 2 mil thick orificeless cover plate 14' was utilized to produce an inwardly tapering orifice in which the inner aperture 18b is approximately 5 to 6 times the width of the outer aperture 20b. Finally, in FIG. 4c, an approximately 3 mil thick orificeless cover plate 14' was utilized to produce a tapered orifice having a single aperture and a pair of inner apertures 18c, 18d and a single outer aperture 20c. Here, all three apertures 18c, 18d and 20c have approximately the same diameter.

Thus, there has been described and illustrated herein a method for producing tapered orifice arrays in fully assembled ink jet printheads in which orifices tapered inwardly with respect to the direction of droplet ejection may be formed after assembly of an orificeless ink jet printhead, thereby providing an improved method of assembling ink jet printheads which avoids the possibility of inadvertently partially blocking channel orifices with adhesive during the final assembly step. However, those skilled in the art will recognize that many modifications and variations besides those specifically mentioned may be made in the techniques described herein without departing substantially from the concept of the present invention. Accordingly, it should be clearly understood that the form of the invention described herein is exemplary only and is not intended as a limitation on the scope of the invention.

What is claimed is:

1. A method of forming an orifice for an ink jet printhead comprising the steps of:
   providing a main body portion and a cover plate for said ink jet printhead, said main body portion having a front side and an ink-carrying channel axially extending therethrough for the ejection of ink from the front side of said main body portion, said cover plate formed from an ablateable material and having front and back sides;
   mounting said back side of said cover plate onto said front side of said ink jet printhead main body portion, said cover plate covering said ink-carrying channel;
   generating first and second light beams capable of ablating said material used to form said cover plate;
   forming an ink-carrying channel communicating orifice extending through said cover plate and tapering outwardly from said front side of said cover plate to said back side of said cover plate by directing said first and second light beams at said front side of said cover plate at first and second angles, respectively, such that said first and second light beams form said outwardly tapered orifice in communication with said ink-carrying channel.

2. A method according to claim 1 wherein the step of forming an outwardly tapered orifice further comprises the step of forming an orifice having a height which increases from said front side of said cover plate to said back side of said cover plate.

3. A method according to claim 1 wherein the step of forming an outwardly tapered orifice further comprises the step of forming an orifice having a first opening at said front side of said cover plate and first and second openings in communication with said ink-carrying channel at said back side of said cover plate.

4. A method according to claim 1 and further comprising the step of varying the width and/or height of said orifice at said back side of said cover plate.

5. A method according to claim 4 wherein the step of varying the width of said orifice at said back side of said cover plate further comprises the step of forming a cover plate having a selected thickness based upon the desired width of said orifice at said back side of said cover plate.

6. A method according to claim 4 wherein the step of varying the width of said orifice at said back side of said cover plate further comprises the step of directing said first and second light beams at said cover plate at first and second angles selected based upon the desired width of said orifice at said back side of said cover plate.

7. A method according to claim 1 wherein the step of forming an ink-carrying channel communicating orifice extending through said cover plate and tapering outwardly from said front side of said cover plate to said back side of said cover plate by directing said first and second light beams at said front side of said cover plate at first and second angles, respectively, such that said first and second light beams form said outwardly tapered orifice in communication with said ink-carrying channel further comprises the steps of:
   directing said first and second light beams at a primary reflecting surface;
   reflecting said first and second light beams at first and second secondary reflecting surfaces, respectively;
   reflecting said first light beam reflected to said first secondary reflecting surface at a specified location on said front side of said cover plate; and
   reflecting said second light beam reflected to said second secondary reflecting surface at said specified location;
   wherein said first and second light beams reflected at said specified location ablate said cover plate material to form said outwardly tapered orifice in communication with said inkcarrying channel 8. A method according to claim 1 wherein the step of forming an ink-carrying channel communicating orifice extending through said cover plate and tapering outwardly from said front side of said cover plate to said back side of said cover plate by directing said first and second light beams at said front side of said cover plate at first and second angles, respectively, such that said first and second light beams form said outwardly tapered orifice in communication with said inkcarrying channel further comprises the step of shaping said generated light beam to ablate said outwardly tapering orifice when directed at said front side of said cover plate.

9. A method of forming a tapered orifice in an assembled ink jet printhead having a main body having a front side and at least one ink-carrying channel axially extending therethrough, each of said at least one ink-carrying channel in communication with said front side for the ejection of ink from said front side of said main body, and a cover plate having a back side fixedly mounted on said front side of said main body and a front side, said cover plate covering said at least one ink-carrying channel, comprising the steps of:
   generating first and second light beams capable of ablating material used to form said cover plate;
   directing said first and second light beams at a selected location on the front side of said cover plate, said first and second light beams directed at said selected location at first and second angles, respectively, such that said first and second light beams plate an ink-carrying channel communicating orifice extending through said cover plate and tapering outwardly therethrough.

10. A method of forming an orifice array for an ink jet printhead comprising the steps of:
   providing an ink jet printhead body having a front side and a plurality of ink-carrying channels axially extending therethrough, said ink-carrying channels in communication with said front side for the ejection of ink from said front side of said ink jet printhead body;
   selecting a cover plate having front and inner sides to be mounted onto said front side of said ink jet printhead body based upon the desired size at the inner side of said cover plate of the orifices to be formed;
   mounting the inner side of said cover plate onto said front side of said ink jet printhead body to cover said inkcarrying channels;

generating first and second cover plate ablating light beams for each orifice to be formed;

directing said front and second cover plate ablating light beams to specified locations on the front side of said cover plate corresponding to selected ones of said ink-carrying channels, said first and second cover plate ablating light directed towards said specified locations at first and second angles, respectively, to form ink-carrying channel communicating orifices extending through said cover plate, tapering outwardly therethrough and in respective communication with said selected ones of said ink-carrying channels.

11. A method according to claim 10 and further comprising the steps of:

selecting a filter based upon the number and location of orifices forming said orifice array; and directing said cover plate ablating light towards said filter, said filter passing cover plate ablating light beams for forming said orifice array of outwardly tapered orifices.

12. A method according to claim 11 wherein the step of directing said cover plate ablating light to specified locations on the front side of said cover plate corresponding to selected ones of said ink-carrying channels further comprises the steps of:

directing said cover plate light passing through said filter at a primary reflecting surface;

reflecting said light beams at first and second secondary reflecting surfaces, respectively;

reflecting said light beams reflected to said first secondary reflecting surface at said specified locations on the front side of said cover plate; and reflecting said light beam reflected to said second secondary reflecting surface at said specified locations;

wherein said light beams reflected at said specified locations ablate said cover plate material to form said outwardly ablate said cover plate material to form said outwardly tapered orifices in communication with said selected ink-carrying channels.

* * * * *